United States Patent [19]
Fukasawa et al.

[11] Patent Number: 5,463,660
[45] Date of Patent: Oct. 31, 1995

[54] BLOCK-SPREADING CODE-DIVISION MULTIPLE-ACCESS DEMODULATOR WITH IMPROVED INTERFERENCE CANCELLATION

[75] Inventors: Atsushi Fukasawa; Manabu Kawabe; Akiyoshi Kawahashi; Takuro Sato, all of Tokyo, Japan

[73] Assignee: Oki Electric Industry Co., Ltd., Tokyo, Japan

[21] Appl. No.: 283,172

[22] Filed: Aug. 3, 1994

[30] Foreign Application Priority Data

Aug. 31, 1993 [JP] Japan .................................. 5-215417

[51] Int. Cl.⁶ .................................................. H04B 1/69
[52] U.S. Cl. ........................................................ 375/205
[58] Field of Search ............................................. 375/205

[56] References Cited

U.S. PATENT DOCUMENTS 5,394,434  2/1995  Kawabe et al. ......................... 375/205

FOREIGN PATENT DOCUMENTS 493904  7/1992  European Pat. Off. .
526439  2/1993  European Pat. Off. .

OTHER PUBLICATIONS

Yoon et al, "A Spread–Spectrum Multi–Access System with a Cascade of Co–Channel Interference Cancellers for Multipath Fading Channels", IEEE ISSSTA '92, 1992, pp. 87–90.

Ewerbring et al, "CDMA with Interference Cancellation: A Technique for High Capacity Wireless Systems", ICC '93 Geneva, 1993; pp. 1901–1906.

Li Fung Chang et al., "Performance of a CDMA Radio Communications System with Feed–Back Power Control and Multipath Dispersion", IEEE Global Telecommunications Conference, Dec. 2–5, 1991, Phoenix, Ariz. USA, vol. 2, pp. 1017–1021.

*Primary Examiner*—Salvatore Cangialosi
*Attorney, Agent, or Firm*—Steven M. Rabin

[57] ABSTRACT

In a block-spreading code-division multiple-access communication system a demodulator stores received chip data in a separate memory area for each transmitting station. Each area has a capacity of at least two blocks. When a complete block is received from a transmitting station, all blocks of data stored in the corresponding memory area are correlated against a set of product codewords, which are obtained by spreading a set of orthogonal codewords by the transmitting station's spreading code, to find the codeword that gives the maximum correlation value. For the oldest block, this correlation value and information identifying the codeword are output. For all blocks, the maximum correlation value and corresponding product codeword are used to calculate interference correction data, which are subtracted from the data in other memory areas.

16 Claims, 7 Drawing Sheets

FIG. 5
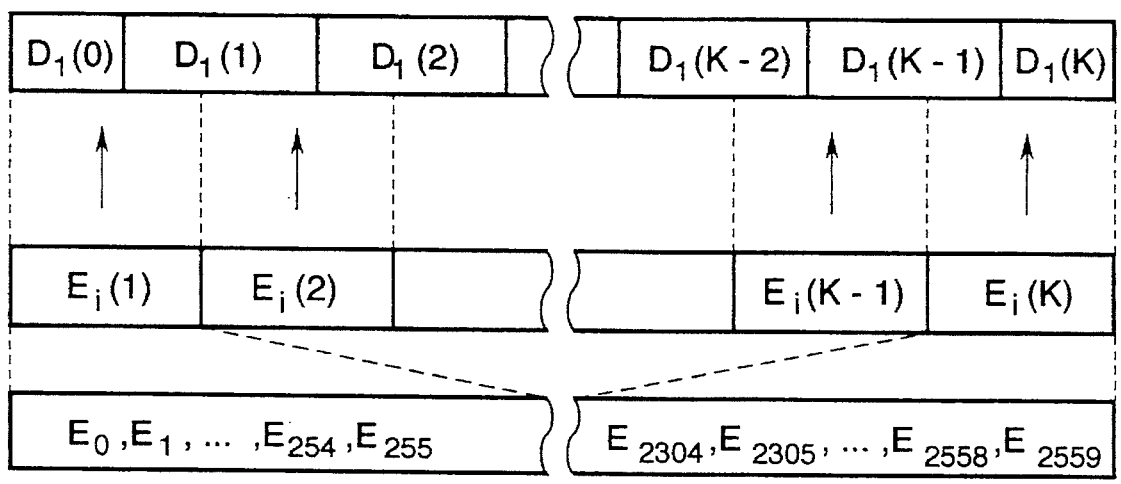
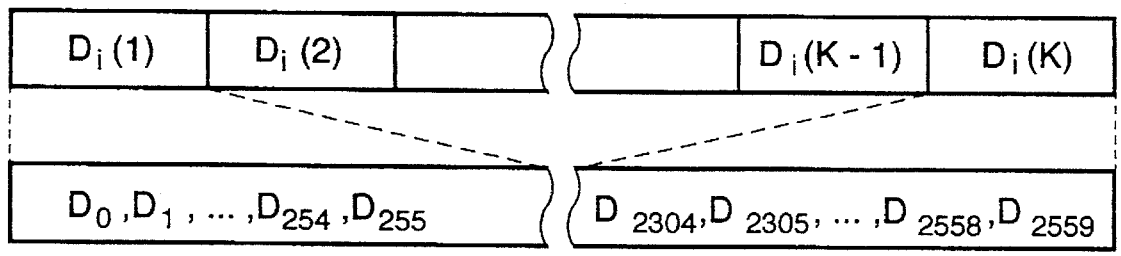

NUMBER OF TRANSMITTING STATIONS 5,463,660

BLOCK-SPREADING CODE-DIVISION MULTIPLE-ACCESS DEMODULATOR WITH IMPROVED INTERFERENCE CANCELLATION

CROSS-REFERENCE TO RELATED APPLICATION

This application claims the priority benefits of Japanese Patent Application No. 215,417/93, filed Aug. 31, 1993, the entire disclosure of which is incorporated herein by reference.

BACKGROUND OF THE INVENTION

This invention relates to a demodulator for a code-division multiple-access (CDMA) communication system of the block-spreading type.

CDMA is a spread-spectrum system employed in personal communication systems and other mobile communication systems, in which multiple stations transmit simultaneously over the same frequency band. In a block-spreading CDMA system, data to be transmitted are divided for modulation into P-bit blocks. Each block is converted to a Q-chip codeword, which is then further modulated by a spreading code to generate a baseband transmit signal. (P and Q are positive integers.) The Q-chip codewords are mutually orthogonal and are the same at all transmitting stations, but each station uses a different spreading code. A receiver demodulates the data transmitted from a particular station by, for example, multiplying the incoming baseband signal by that station's spreading code, correlating each resulting block with all possible codewords, and selecting the codeword that gives the highest correlation.

It is known that the channel capacity of such a system can be improved if the receiver takes steps to cancel interference between different transmitting stations. One interference-canceling system relies on the fact that signals from different transmitting stations usually arrive with different strengths. The receiver first demodulates the strongest signal, then cancels it out as interference and demodulates the strongest remaining signal, continuing in this way until all signals have been demodulated. Unfortunately, this system does not work well when several signals arrive with substantially the same strength.

Another possible system demodulates the signals from all transmitting stations in parallel, subtracting the estimated interference generated by each station from the signals of all the other stations. The process can be iterated to obtain increasingly accurate estimates of the transmitted signals and their interference. This system appears to work well in theory, but when its actual behavior is simulated it performs poorly, because it fails to take maximum advantage of the available interference information. The initial estimates of interference from a given station, for example, are always derived from a signal from which interference has not yet been removed.

SUMMARY OF THE INVENTION

It is accordingly an object of the present invention to reduce interference in a block-spreading CDMA communication system.

Another object of the invention is to increase the number of stations that can access a block-spreading CDMA communication system simultaneously.

The invented demodulator is used in a receiving station that receives a combined signal from a plurality of transmitting stations. The received signal yields baseband chip data that are stored in a memory having a separate memory area for each transmitting station. Each memory area holds data for a plurality of blocks. While residing in the memory, the data are updated as follows.

When the receiving station finishes receiving a block from one transmitting station, it designates that transmitting station and the corresponding memory area for processing. Each data block stored in the designated memory area is correlated with a set of product codewords obtained by spreading all codewords in a set of orthogonal codewords by the spreading code of the designated transmitting station, and the product codeword that gives a maximum correlation value for that block is selected.

For each block, the selected product codeword and maximum correlation value are used to calculate a set of interference correction data. The underlying principle in this step is to estimate interference by multiplying the product codeword by the maximum correlation value, then subtract a term that estimates already-canceled interference.

The interference correction data are then subtracted from the corresponding chip values stored in all other memory areas, thereby updating all data stored in the memory, except for the data stored in the designated memory area. For the oldest block in the designated memory area, the demodulator outputs the above maximum correlation value and information identifying the codeword that was spread to generate the selected product codeword.

BRIEF DESCRIPTION OF THE DRAWINGS

FIG. 5 is a diagram illustrating interference cancellation.

DETAILED DESCRIPTION OF THE INVENTION

Figure 1:
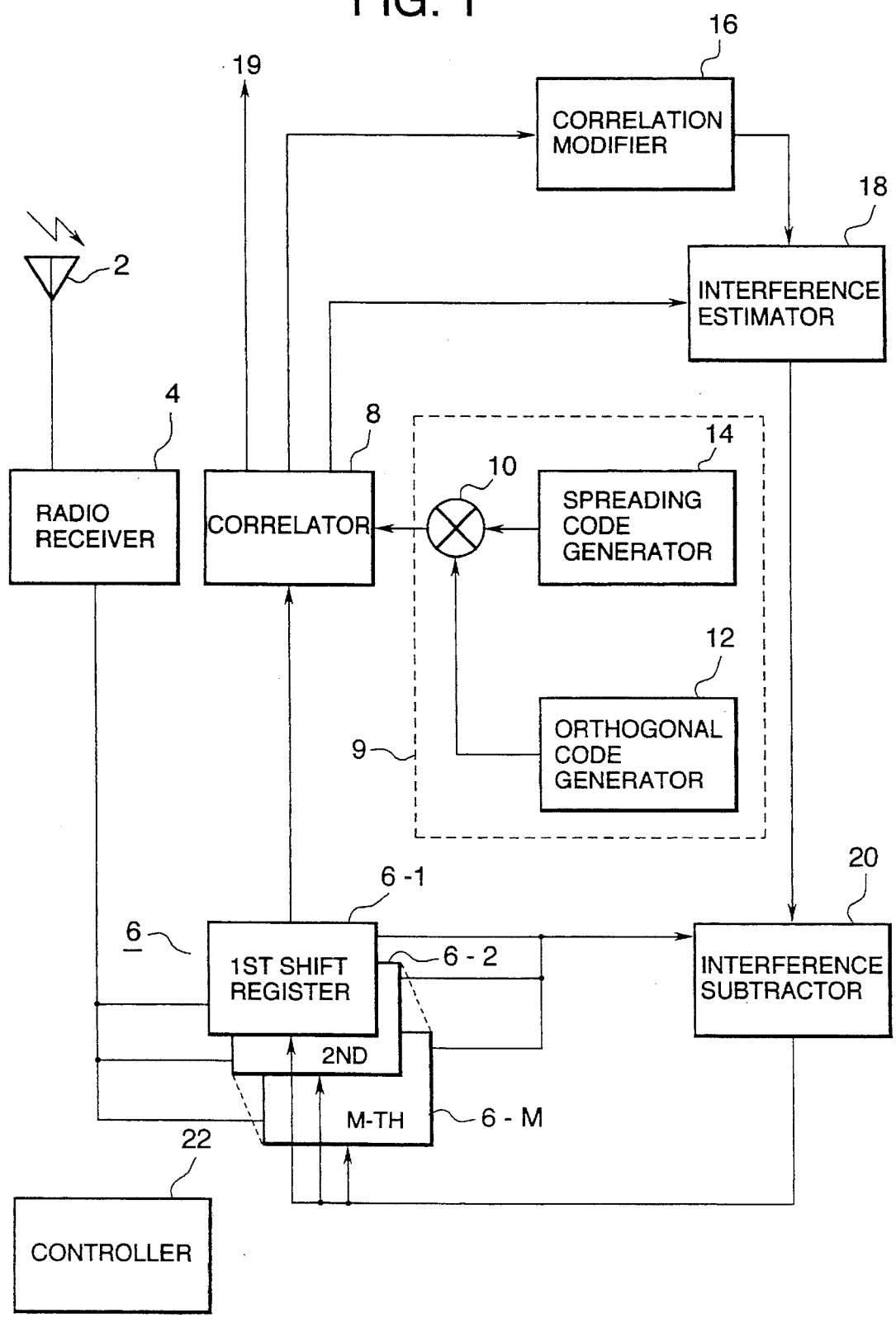
FIG. 1 is a block diagram illustrating the invented demodulator.

The invention will next be described with reference to the attached drawings. These drawings illustrate the invention but do not restrict its scope, which should be determined solely from the appended claims.

In the following description, the Q-chip codewords are drawn from a standard set of $2^P$ orthogonal codewords used at all transmitting and receiving stations. A typical codeword will be denoted by the symbol $W_y$, where y is a codeword number from 0 to $2^P-1$ by which the codeword is identified. Codewords can be assigned to P-bit blocks of data by, for example, treating the value of the block as a pointer that indicates a particular codeword.

The Q chips making up a codeword each take on the value plus or minus one. The orthogonality of the codewords means that if x≠y, the inner product of codewords $W_x$ and $W_y$ is zero; that is, the sum of the products of their corresponding chip values is zero. Due to the orthogonality requirement, Q must exceed P; the chip rate is higher than the bit rate.

The spreading code (also called the access code) of a particular transmitting station is also a series of chips with values of plus or minus one. The spreading code has a chip rate that is N times higher than the codeword chip rate, where N is a positive integer. N may be equal to one, in which case the two chip rates are equal. The spreading code of the i-th transmitting station is, for example, a pseudo-random noise code, and will be denoted by the symbol $PN_i$.

A codeword is spread by dividing the duration of each of is constituent chips into N equal parts and multiplying each part by the corresponding spreading-code chip value. The resulting product codeword will be denoted by the symbol $W_y PN_i$, which indicates multiplication of corresponding values at corresponding points on the time axis. This product codeword, which becomes the baseband transmit signal, has a rate of Q×N chips per block. Each chip in the product codeword also has a value of plus or minus one.

The baseband transmit signal modulates a carrier signal to produce a radio-frequency transmit signal. All transmitting stations employ the same carrier frequency, so the signals transmitted from their antennas all arrive in the same frequency band. A receiving station demodulates this combined radio-frequency signal to a baseband receive signal in which the baseband transmit signals of all stations are superimposed. From this baseband receive signal, the invented demodulator will determine the codewords transmitted by each transmitting station, thereby enabling the data transmitted by each station to be recovered.

Modulation and demodulation between the baseband and radio-frequency band is carried out by well-known methods, detailed descriptions of which will be omitted. Also omitted will be a description of error-correcting encoding, which commonly precedes the assignment of codewords $W_y$ to data blocks, and error-correcting decoding, which is then applied to the output of the invented demodulator.

The transmitting stations are not synchronized with one another; that is, their blocks do not all begin and end simultaneously. The receiving station must therefore synchronize separately with each transmitting station, so that it can recognize when each transmitting station has finished transmitting a block. The receiving station must also be able to generate the spreading code used by each transmitting station, in synchronization with that transmitting station. Methods of acquiring and maintaining spreading-code synchronization and block synchronization are well known, so descriptions will be omitted.

Referring to FIG. 1, the receiving station has an antenna 2 for receiving a radio-frequency signal, and a radio receiver 4 for amplifying the received signal and converting it to a baseband signal. The baseband signal is fed to a demodulator comprising the rest of the elements in FIG. 1.

The demodulator has a memory 6 organized as a set of shift registers 6-1 . . . 6-M, where M is the number of transmitting stations. The received baseband signal is input separately to each of these shift registers a chip at a time, and shifted in each register toward the right in the drawing. Each shift register is long enough to accommodate data for K blocks, where K is a suitable integer greater than one. Accordingly, each shift register stores Q×N×K chips.

Blocks of data from the shift registers are fed to a correlator 8, which correlates each block with a set of product codewords. The product codewords are obtained from a product codeword generator 9 comprising a multiplier 10, orthogonal codeword generator 12, and spreading code generator 14. The correlator 8 selects the product codeword that gives the maximum correlation value, supplies that maximum correlation value to a correlation modifier 16, and supplies the product codeword to an interference estimator 18. The correlator 8 also outputs the maximum correlation value of the oldest block to an output port 19, together with information identifying the codeword that was spread to obtain the selected product codeword of that block.

The correlation modifier 16 modifies the maximum correlation values obtained from the correlator 8, and supplies the modified correlation values to the interference estimator 18, which calculates interference correction data. An interference subtractor 20 updates the memory 6 by subtracting time interference correction data from the data of other stations.

The operations of the foregoing demodulator elements are coordinated and controlled by a controller 22, which detects block boundaries in the receive data.

The demodulator elements in FIG. 1 are preferably implemented as one or more digital integrated circuits, such as standard memory and processor integrated circuits, or application-specific integrated circuits. The orthogonal codeword generator 12 may be, for example, a read-only memory in which the $2^P$ codewords $W_y$ are stored. The spreading code generator 14 may comprise, for example, one or more pseudo-random noise generators, such as shift registers with feedback taps, which are adapted to generate the spreading codes of the M transmitting stations. Detailed descriptions of the circuit configurations of the individual elements in FIG. 1 will be omitted to avoid obscuring the invention with needless detail.

Next the operation of the invented demodulator will be described, with reference to FIG. 1 and the flowcharts in FIGS. 2, 3, and 4.

Figure 2:
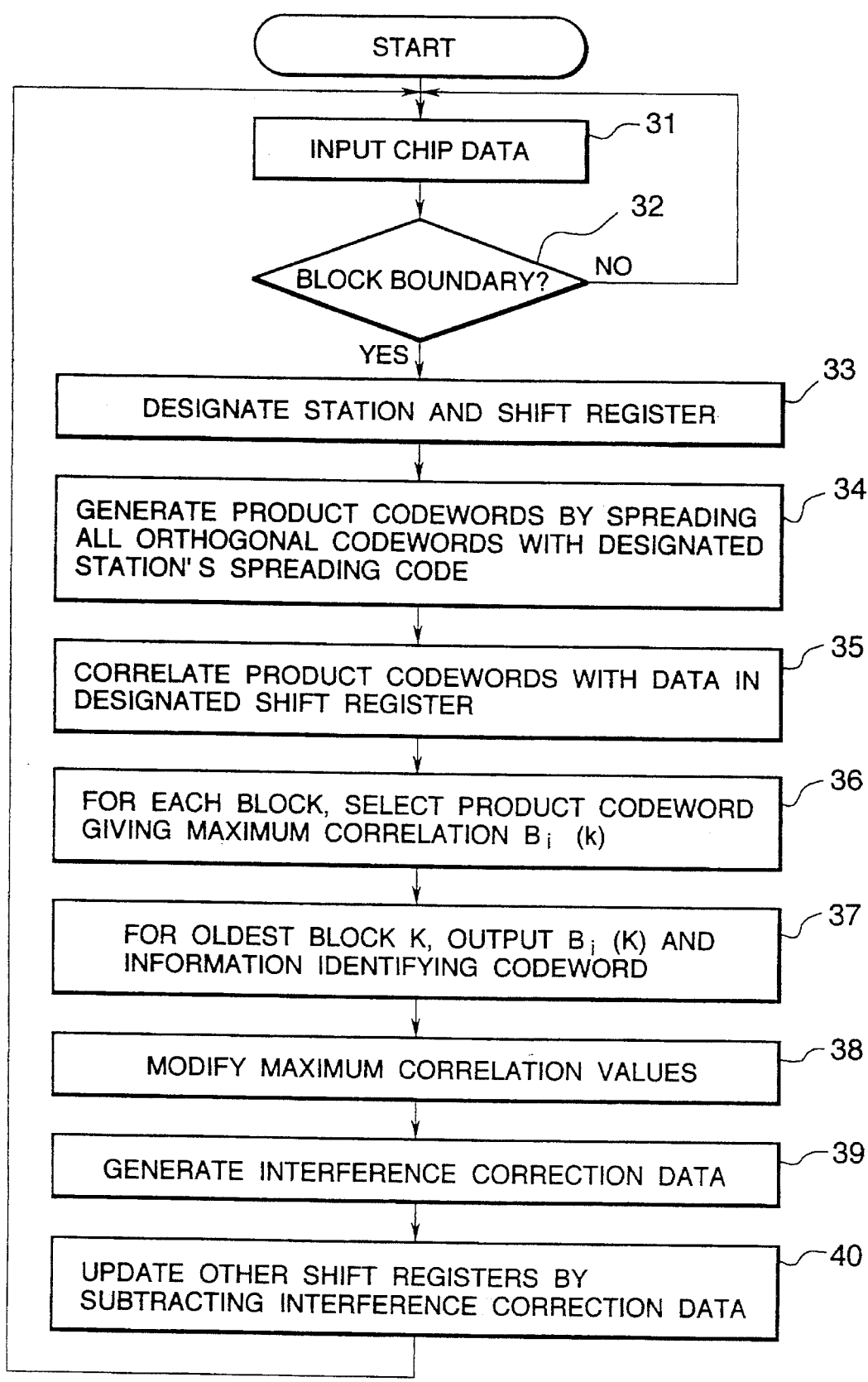
FIG. 2 is a flowchart illustrating the operation of the invented demodulator.

Referring to FIG. 2, in the first step 31 the baseband receive signal output from the radio receiver 4 is sampled to obtain one chip value, and this value is input into all the receive shift registers 6-1, . . . 6-M.

In the next step 32 the controller 22 decides whether the chip just input is the last chip of a block from any transmitting station. If It is not, the first two steps 31 and 32 are repeated for the next chip.

When the controller 22 recognizes the end of a transmitted block, in the next step 33 it designates the station that transmitted that block, and designates the corresponding shift register. If the i-th station and shift register 6-i are designated, the entire contents of shift register 6-i, comprising data for K complete blocks, are transferred from the memory 6 to the correlator 8.

If two stations i and j reach block boundaries simultaneously, they are designated in turn according to a fixed rule, such as lowest-numbered station first. The stations are thus designated in a regular cyclic order.

In the next step 34, the product codeword generator 9 generates product codewords representing the full set of orthogonal codewords spread by the designated station's spreading code. This step is carried out as follows.

The full set of $2^P$ orthogonal codewords $W_y$ is output by the orthogonal codeword generator 12. For each block, the spreading code generator 14 generates the i-th station's spreading code $PN_i$ for the interval covered by that block. The multiplier 10 uses $PN_i$ to spread each of the $2^P$ codewords $W_y$, thereby obtaining, for each block, $2^P$ product codewords of the form $W_y PN_i$ (y=0 to $2^P-1$). These multiplications can be carried out rapidly because the values are all plus or minus one.

In the next step 35, the correlator 8 correlates the data received from the designated shift register 6-i with the product codewords $W_y PN_i$ obtained by the product codeword generator 9 and, for each block, selects the product codeword that gives the maximum correlation value. This step is carried out as follows.

If $D_i(k)$ denotes the chip data stored in shift register 6-i for the k-th block, the correlator 8 takes the inner product $D_i(k)$ with each of the product codewords $W_y PN_i$ obtained for that block, dividing the results by Q×N so that their absolute values do not exceed unity. Each such inner product measures the correlation between product codeword $W_y PN_i$ and data $D_i(k)$. The formula for the inner product is $$[1/(Q\times N)]\Sigma D_i(k) W_y PN_i(t)$$

where summation is over all chips in the k-th block.

In the next step 36, for each block k (k=1 to K), the correlator 8 selects the product codeword that gives the maximum correlation value. The corresponding codeword number will be denoted $y_{mi(k)}$, the product codeword will be denoted $W_{ymi(k)} PN_i$, and its correlation value will be denoted $B_i(k)$. The formula for $B_i(k)$ is $$B_i(k)=max\{[1/(Q\times N)]\Sigma D_i(k) W_y PN_i(t)\}$$

$$(y=0 \text{ to } 2^P-1)$$

$W_{ymi(k)}$ is the orthogonal codeword that, when spread by $PN_i$, yields the maximum correlation $B_i(k)$ with the data $D_i(k)$ of the k-th block.

For the oldest block (the K-th block), in the next step 37 the correlator 8 outputs to output port 19 the maximum correlation value $B_i(K)$, together with information identifying the codeword $W_{ymi(K)}$. This identifying information may be, for example, the codeword $W_{ymi(K)}$ itself, or the codeword number $y_{mi(K)}$. The identifying information is used by a decoder (not shown in the drawings) to correct errors and reconstruct the original data transmitted by the transmitting station. The correlation value $B_i(K)$ is useful in this process, as it provides a measure of the reliability of the data.

In the next step 38, For each block k (k=1 to K), the correlation modifier 16 modifies the maximum correlation value $B_i(k)$ to a value $C_i(k)$ that is closer to unity. Normally $B_i(k)$ will be greater than zero, so the modification can be made by taking the square root:

$$C_i(k)=B_i(k)^{1/2}$$

The invention is not restricted to use of the square root function to modify the correlation values. Another mathematical function can be used instead.

The correlation modifier 16 and modification step 38 can also be omitted entirely, the unmodified correlations $B_i(k)$ being used directly. Simulation has shown, however, that replacement of $B_i(k)$ by $C_i(k)$ results in quicker convergence, so that fewer iterations are necessary and fewer blocks have to be stored in the memory 6. That is, modification of the correlation values enables the value of K to be reduced.

In the next step 39, for each block k (k=1 to K), the interference estimator 18 uses the modified correlation value $C_i(k)$ and selected product codeword $W_{ymi(k)} PN_i$ of the k-th block to calculate interference correction data $E_i(k)$. Two methods of performing this calculation will be shown later. The interference correction data $E_i(k)$ are an estimate of interference that was generated by the i-th transmitting station and has not yet been canceled from the data of the other transmitting stations.

In the last step 40, the interference subtractor 20 updates the contents of all shift registers 6-j except the designated shift register 6-i by subtracting the interference correction data $E_i(k)$. In this way the baseband signal transmitted by the i-th station is gradually canceled out of the data from the other stations. A more detailed description of this step will be given later.

Next two methods of calculating the interference correction data $E_i(k)$ will be explained.

Figure 3:
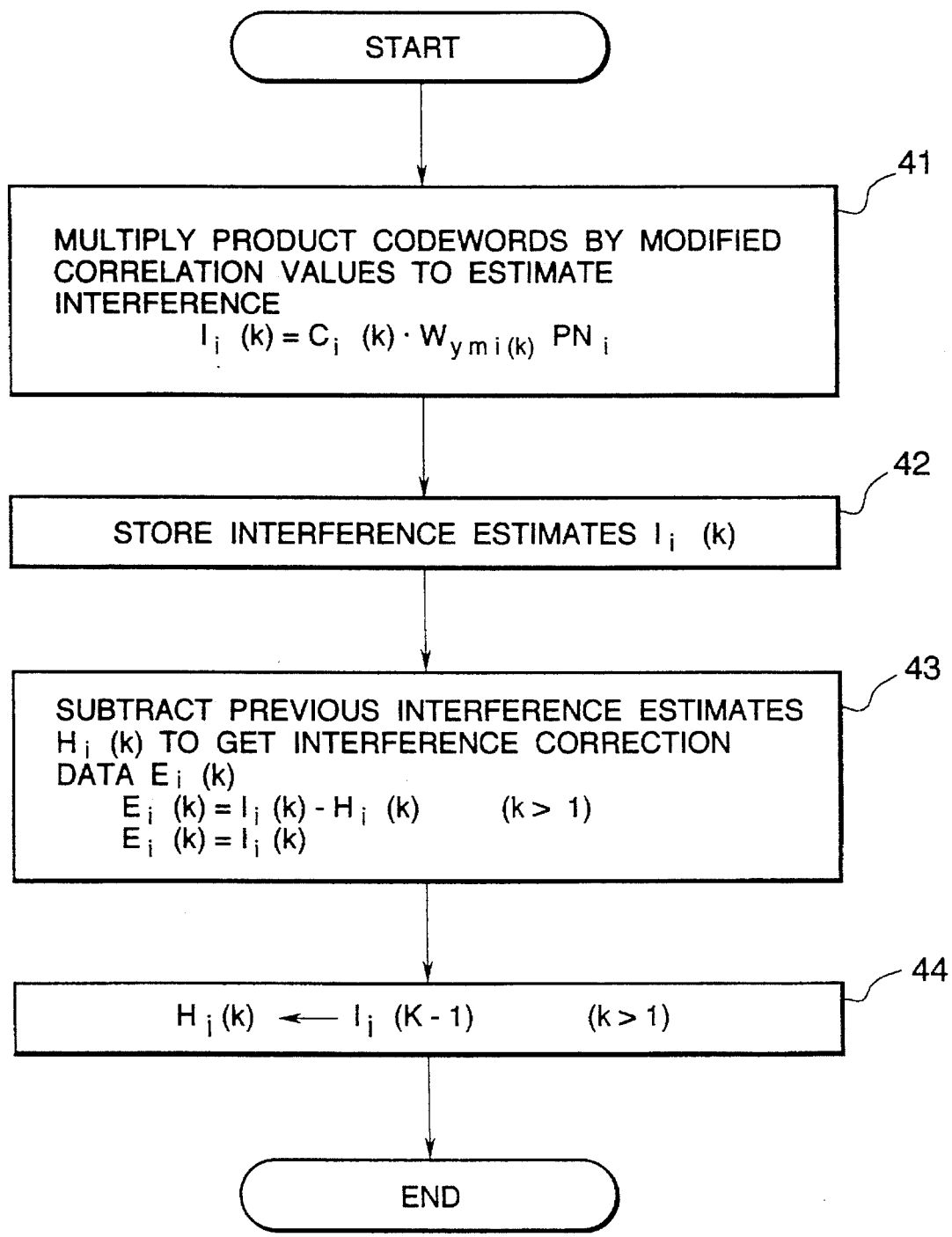
FIG. 3 is a flowchart illustrating a method of calculating interference correction data.

Referring to FIG. 3, in the first method, when the interference estimator 18 receives a product codeword $W_{ymi(k)} PN_i$ from the correlator 8 and a modified correlation value $C_i(k)$ from the correlation modifier 16, it multiplies each chip value in $W_{ymi(k)} PN_i$ by $C_i(k)$. The resulting products, which will be collectively denoted $I_i(k)$, estimate interference caused by the signal transmitted the i-th station in the data stored in the memory 6 for other transmitting stations (step 41). $I_i(k)$ denotes Q×N chip values of the form:

$$I_i(k)=C_i(k)\cdot W_{ymi(k)} PN_i$$

The modified correlation value $C_i(k)$ is an indication of the reliability of $W_{ymi(k)} PN_i$. Multiplying $W_{ymi(k)} PN_i$ by $C_i(k)$ prevents the demodulator from making large corrections on the basis of unreliable data.

In the next step 42, the interference estimator 18 temporarily stores the current interference estimates $I_i(k)$. This same step was of course carried out the last time the i-th station was designated, and the interference estimates $H_i(k)$ that were temporarily stored at that time are still present, so $I_i(k)$ and $H_i(k)$ are simultaneously available. The $H_i(k)$ represent estimated interference that has already been canceled. Since the data have been shifted by one block in shift register 6-i, for values of k greater than one, $H_i(k)$ is the value of $I_i(k-1)$ that was calculated the last time the i-th station was designated. For the first block (k=1), there was no previous interference estimate, so $H_1(k)$ consists entirely of zero values.

In the next step 43, the interference estimator 18 subtracts $H_i(k)$ from $I_i(k)$ to calculate the interference correction data $E_i(k)$. $E_i(k)$ thus denotes Q×N chip values of the form:

$$E_i(k)=I_i(k)-H_i(k)$$

For the first block, since $H_1(k)$ is all zeros, no subtraction need be performed: $E_1(k)=I_1(k)$.

$E_i(k)$ represents that part of the current interference estimate $I_i(k)$ that has not already been canceled. After the interference subtractor 20 subtracts the $E_i(k)$ data, the $I_i(k)$ values will be entirely canceled from the shift registers of other transmitting stations in the memory 6.

In the next step 44, the interference estimator 18, having finished with the previous interference estimates $H_i(k)$, replaces them with the current interference estimates $I_i(k)$ in preparation for the next time the i-th station is designated. The substitution is carried out as follows:

$$H_i(k) \rightarrow I_i(k-1) \ (k=2, \ldots K)$$

The method in FIG. 3 is correct in principle and has the advantage of accuracy, but it requires a large number [Q×N×(K−1)] of subtraction operations to calculate the interference correction data. The second method, described below, requires fewer subtractions and entails only a slight loss of accuracy.

Figure 4:
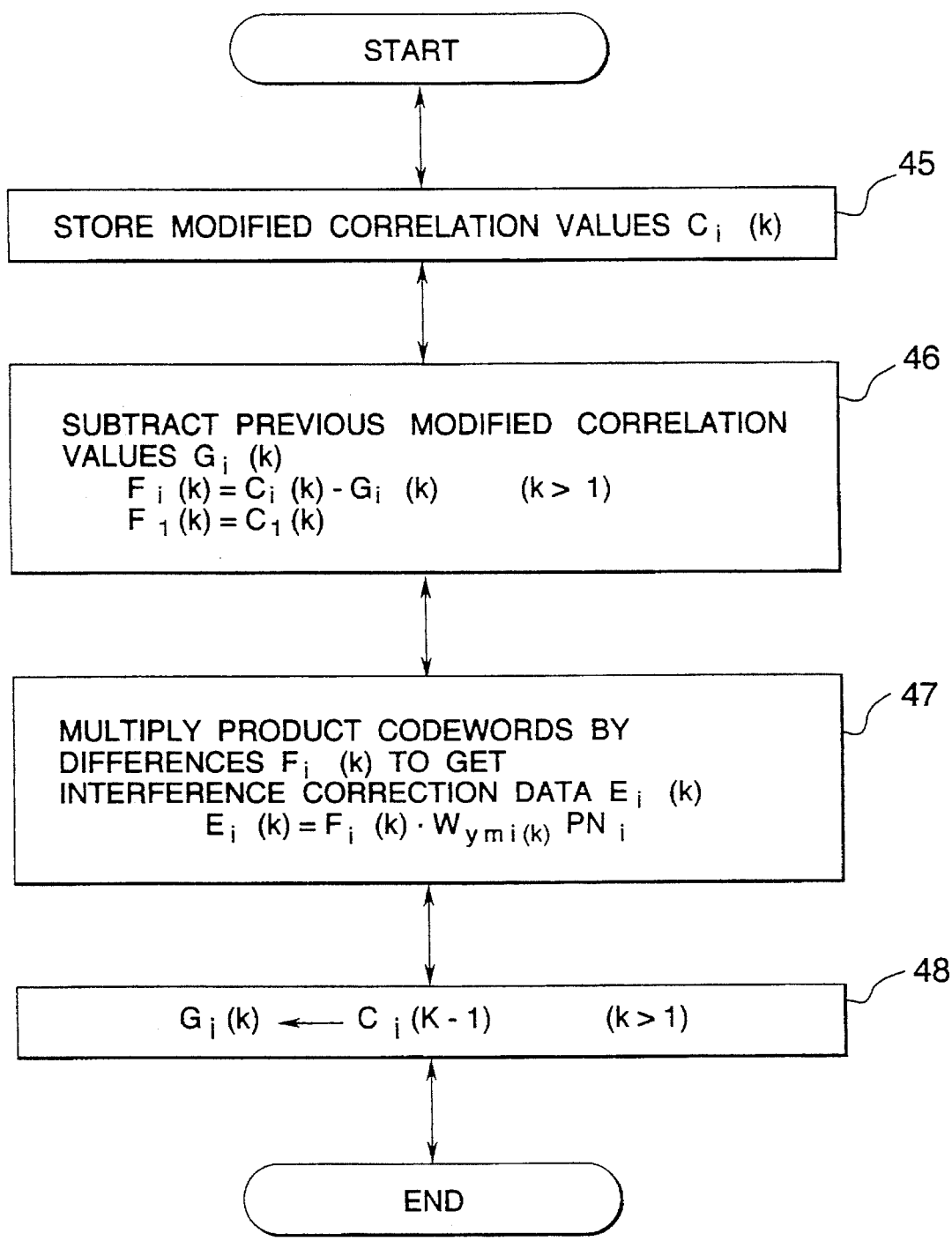
FIG. 4 is a flowchart illustrating another method of calculating interference correction data.

Referring to FIG. 4, in the second method, the interference estimator 18 begins in step 45 by temporarily storing the modified correlation values $C_i(k)$. This step was also performed the last time the i-th station was designated, and the modified correlation values $G_i(k)$ stored at that time are still present, so that both the current and previous modified correlation values $C_i(k)$ and $G_i(k)$ are available simultaneously. For the first block (k=1), there was no previous correlation, so $G_i(1)$ is zero. For other blocks, $G_i(k)$ is the previous value of $C_i(k-1)$.

In the next step 46, the interference estimator 18 calculates, for each block, the difference $F_i(k)$ between $C_i(k)$ and $G_i(k)$.

$$F_i(k)=C_i(k)-G_i(k)$$

In the next step 47, the interference calculator 18 calculates the interference correction data $E_i(k)$ by multiplying the product codeword values $W_{ymi(k)}PN_i$ received from the correlator 8 by these difference values $F_i(k)$. $E_i(k)$ thus denotes Q×N chip values of the form:

$$\begin{aligned} E_i(k) &= F_i(k) \cdot W_{ymi(k)}PN_i \\ &= C_i(k) \cdot W_{ymi(k)}PN_i - G_i(k) \cdot W_{ymi(k)}PN_i \\ &= I_i(k) - G_i(k) \cdot W_{ymi(k)}PN_i \end{aligned}$$

In the next step 48, the interference calculator 18 substitutes the current modified correlation values $C_i(k)$ for use as the previous values $G_i(k)$ the next time the i-th station is designated. The substitution is carried out as follows:

$$G_i(k)\rightarrow C_i(k-1)\ (k=2,\ldots K)$$

In comparison with the First method, which required [Q×N×(K−1)] subtractions to calculate the interference correction data, the second method requires only (K−1) subtractions. Moreover, if the same product codeword $W_{ymi(k)}PN_i$ was selected both times, both methods give the same result. The reason is that, in this case:

$$H_i(k)=G_i(k)\cdot W_{ymi(k)}PN_i$$

If the same product codeword $W_{ymi(k)}PN_i$ was not selected both times, it is likely that the product codeword selected the previous time was incorrect, and that the modified correlation value $G_i(k)$ was correspondingly small, so the difference between the two methods of calculation is slight.

Next a more detailed description of the memory update performed by the interference subtractor 20 will be given. At this point it is useful to introduce a parameter t that indicates the positions of individual chips in the shift registers of the memory 6, the values of t ranging from zero up to (K×Q×N)−1. Data in designated shift register 6-i can then be denoted by the symbol $D_{it}$, and data in other shift registers 6-J by the symbol $D_{jt}$. Similarly, the interference correction data will be denoted $E_{it}$ instead of $E_i(k)$. For example, $E_i(1)$ comprises the first Q×N values $E_{i0}$, $E_{i1}$, $E_{i2}$, ...

For each other station j (j≠i), the interference subtractor 8 reads all the data $D_{jt}$ from shift register 6-j, subtracts the corresponding interference correction data $E_{it}$, and writes the result back into shift register 6-j, thus performing the following substitution operation:

$$D_{jt}\rightarrow D_{jt}-E_{it}$$

FIG. 5 illustrates the updating of the first shift register 6-1 by interference correction data from the i-th station. At the instant depicted in FIG. 5, reception of block $D_i(1)$ has just been completed and shift register 6-i contains K complete blocks $D_i(1), D_i(2), \ldots, D_i(K)$, shown at the bottom of FIG. 5.

If, for example, Q=64 and N=4, then there are two hundred fifty-six chips of received data per block. The first block comprises chips $D_0$ to $D_{255}$, as shown, the subscript i being omitted for clarity. If K=10, then the shift register 6-i contains two thousand five hundred sixty chips, and the last block consists of chips $D_{2304}$ to $D_{2559}$.

The demodulator processes data $D_0$ to $D_{2559}$ as described above to derive ten blocks of interference correction data $E_i(1)$ to $E_i(10)$, comprising chip values $E_0$ to $E_{2559}$, which it subtracts from the data in the other shift registers. Since the blocks of different stations are not mutually synchronized, the data of a given block in the designated shift register 6-i will be subtracted from data in two different blocks in other shift registers. For example, interference correction data in block $E_i(1)$ is subtracted partly from data in the first station's block $D_1(0)$, which has not been completely received yet, and partly from data in block $D_1(1)$ which was received a short time ago.

The first few chips of the first block $D_i(1)$ in shift register 6-i are the unaltered data of the baseband receive signal. The other chips in shift register 6-i, however, have already been updated by subtraction of estimated interference from other stations. For example, the last part of block $D_i(1)$ and the first part of block $D_i(2)$ have already been updated by subtracting interference data estimated to have resulted from the first station's block $D_1(1)$. This update was performed at the time when block $D_1(1)$ was completely received and the first station was designated.

The last part of block $D_i(2)$ has been updated twice to subtract estimated interference from the first station's block $D_1(2)$. The first update was performed when block $D_1(2)$ was received. The second update was performed when block $D_1(1)$ was received.

Similar updates have been performed to remove estimated interference from all the other j-th stations, where j≠i. The last chip in the i-th station's first block $D_i(1)$ has been updated M−1 times, once for each of the M−1 other stations. The last chip in the i-th station's last block $D_i(K)$ has been updated K times to cancel interference from each of M−1 stations, making K×(M−1) updates in all.

Although the chip data input to shift-register 6-i represent a combination of the baseband transmit signals of all M transmitting stations, as the chip data move through the shift register and are repeatedly updated by cancellation of interference from the other M−1 stations, they come to resemble the baseband transmit signal of the i-th station alone. The maximum correlation values obtained by the correlator 8 tend to increase accordingly. When the correlator correlates the last block $D_i(K)$, it will usually find a very high correlation with a product codeword $W_{ymi(K)}PN_i$, and the codeword $W_{ymi(K)}$ is very likely to be the codeword actually transmitted by the i-th station. That is, the error rate of the demodulator's output is low.

One reason for the low error rate is that the very first interference estimates for a given block are based on data that have already been partially rid of interference from other stations. Moreover, each time an interference estimate is made, the estimated interference is immediately removed from all relevant data in the memory 6, thereby improving all subsequent estimates for all stations. Every interference estimate is made with the best data available at the time. This is a consequence of the sequential operation of the demodulator, which designates and processes the data of the M transmitting stations cyclically in turn.

Figure 6:
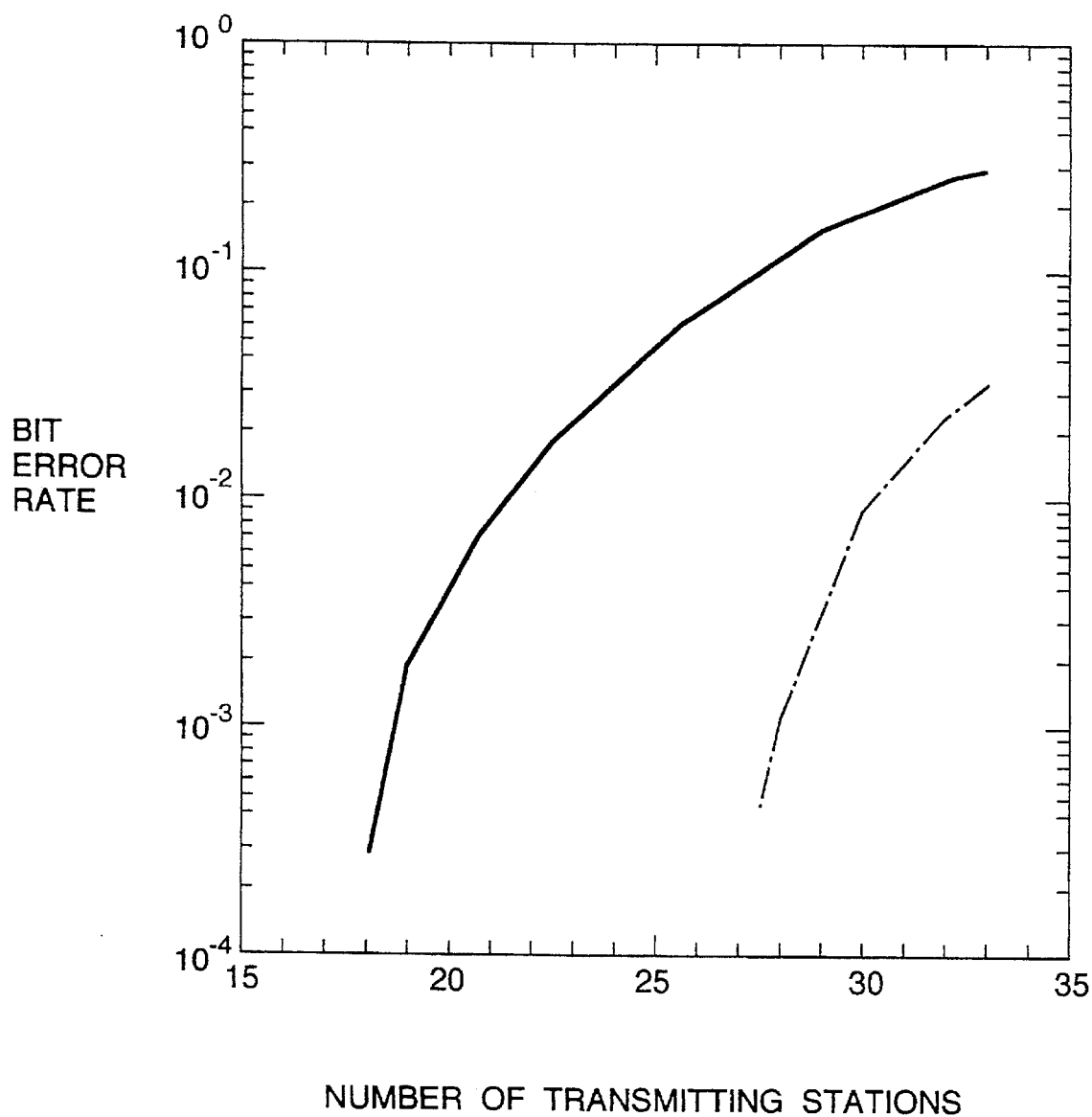
FIG. 6 is a graph illustrating simulated bit-error rates.

FIG. 6 shows the result off a computer simulation of the performance of the invented demodulator and a demodulator of the parallel-processing type, which processes the data for all transmitting stations at the same time. The number of transmitting stations is indicated on the horizontal axis. The bit error rate is indicated on the vertical axis. The solid line represents the performance of the parallel-processing demodulator. The dot-dash line represents the performance of the invented demodulator.

The transmit data were pseudo-random data with a cycle length of $2^9-1$ bits (511 bits). The only noise source was interference from other stations. The orthogonal codewords, which were assigned to six-bit blocks, were the columns of a 64×64 Walsh-Hadamard matrix (P=6 and Q=64). The spreading codes were pseudo-random noise codes with a cycle length of $2^{42}-1$ and spreading gain of four (N=4). The shift registers were ten blocks long (K=10) and stored two thousand five hundred sixty chips each, as in FIG. 5.

As FIG. 6 shows, the sequential processing strategy of the invented demodulator works far better than parallel processing. If the acceptable bit error rate is $10^{-3}$, the invented demodulator lets up to twenty-eight stations transmit simultaneously under the simulated conditions, while parallel processing allows a maximum of only eighteen transmitting stations.

Figure 7:
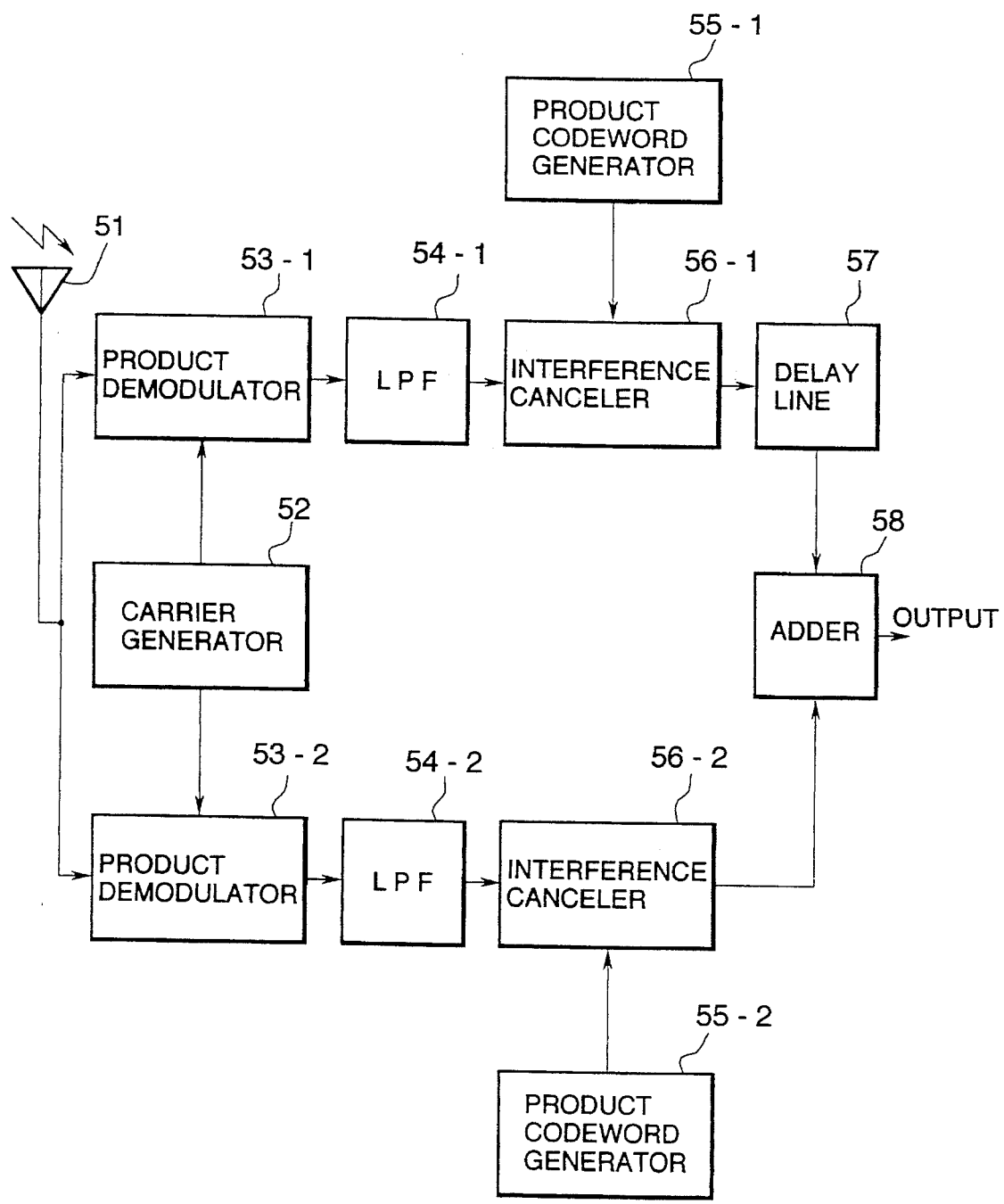
FIG. 7 is a block diagram illustrating an offset quadrature phase-shift keying demodulator incorporating the present invention.

FIG. 7 shows how the invented demodulator can be applied in a system employing a type of quadrature phase-shift keying (QPSK). In this system the baseband signal transmitted at each station modulates two orthogonal carrier signals, which are combined to produce a single radio-frequency transmit signal. Both carriers are modulated by identical baseband chip data, but an offset of one-half chip period may be provided between the two modulating signals, in which case the system is referred to as offset QPSK (OQPSK). FIG. 7 pertains to an OQPSK system. QPSK has the advantage of avoiding zero-crossing distortion, and OQPSK has the further advantage of a constant radio-frequency signal amplitude. QPSK and OQPSK also have well-known advantages in regard to security and jamming.

The receiving station in FIG. 7 comprises a receiving antenna 51, a carrier generator 52, a pair of product demodulators 53-1 and 53-2, a pair of low-pass filters (LPFs) 54-1 and 54-2, a pair of product code generators 55-1 and 55-2, a pair of interference cancelers 56-1 and 56-2, a delay line 57, and an adder 58.

The carrier generator 52 generates two orthogonal carrier signals, supplying one carrier signal to the product demodulator 53-1 and the other carrier signal to the product demodulator 53-2. The product demodulators 53-1 and 53-2 multiply these carrier signals by the radio-frequency signal received from the antenna 51, and the resulting product signals are filtered by the low-pass filters 54-1 and 54-2 to extract a pair of baseband receive signals, which are input to respective interference cancelers 56-1 and 56-2.

Each of the interference cancelers 56-1 comprises a shift-register memory 6, correlator 8, correlation modifier 16, interference estimator 18, and interference subtractor 20 as illustrated in FIG. 1. The product code generators 55-1 and 55-2 are similar to the product code generator 9 in FIG. 1. The baseband receive signals are input to the shift registers and processed as described above. The output from the interference cancelers 56-1 and 56-2 to the delay line 57 and adder 58 consists, in this case, of the Q-chip orthogonal codewords $W_{ymi(K)}$ that gave maximum correlation values for the oldest block (the K-th block) in each shift register. The modified correlation values $C_f(K)$ are output separately, to a decoder not shown in the drawing.

The two interference cancelers 56-1 and 56-2 operate with a mutual offset equal to the offset between the chip data transmitted on the two carrier signals, as described above. The output of interference canceler 56-1 is fed through the delay line 57, which delays it by an amount equal to this offset, thereby restoring synchronism. The synchronized outputs are then added by the adder 58, to produce a final output signal.

In a QPSK system not employing an offset, it suffices to remove the delay line 57 in FIG. 7. To the existing advantages of QPSK and OQPSK, the system in FIG. 7 adds the advantage of increased channel capacity resulting from interference cancellation.

In the systems described above, identical receive data were input to the shift registers in the memory 6, but this is not a restriction. In demodulating the radio-frequency receive signal to obtain the baseband signal, the radio receiver 4 in FIG. 1 commonly starts by demodulating the radio-frequency signal to an intermediate frequency, then demodulates the intermediate-frequency signal to the baseband. It is possible to apply the transmitting stations' spreading codes $PN_i$ and the orthogonal codewords $W_y$ to separate the transmitted signals from one another at the intermediate-frequency level, by a process analogous to that carried out by the correlator 8 at the baseband. The signal input to shift register 6-i will then consist primarily of the signal transmitted by the i-th transmitting station, with residual interference which the invented demodulator will proceed to cancel.

The invented demodulator can be modified in various other ways. For example, ring buffers, random-access memory, or other memory configurations can be employed instead of shift registers and those skilled in the art will recognize that still further modifications can be made without departing from the scope of the invention as claimed below.

What is claimed is:

1. A demodulator for block-spreading code-division multiple-access communications, in which blocks of transmit data are converted to codewords taken from a set of orthogonal codewords common to all transmitting stations, then spread by spreading codes assigned to individual transmitting stations, comprising:

a memory divided into separate memory areas for different transmitting stations, each memory area storing received chip data and updated chip data for a plurality of blocks including at least a newest block and an oldest block;

a product codeword generator for generating a spreading code used by a designated transmitting station, and using said spreading code to spread all codewords in said set of orthogonal codewords, thereby producing corresponding product codewords;

a correlator coupled to correlate data in each of said plurality of blocks in a designated memory area in said memory with said product codewords, to select for each of said blocks a particular product codeword which gives a maximum correlation value, and to output, for said oldest block, said maximum correlation value and information identifying a codeword which was spread to produce said particular product codeword;

an interference estimator coupled to use said particular product codeword and said maximum correlation value to calculate interference correction data, said interference correction data being an estimate of interference that was generated by said designated station and has not yet been canceled;

an interference subtractor coupled to update all data stored in said memory, except data stored in said designated memory area, by subtracting said interference correction data, thereby canceling interference; and a controller for recognizing block boundaries and, when a transmitting station completes transmission of a block, designating that station as said designated station and designating the corresponding memory area in said memory as said designated memory area.

2. The demodulator of claim 1, further comprising a correlation modifier for modifying said maximum correlation value, by raising said maximum correlation value toward unity, before said maximum correlation is used by said interference estimator.

3. The demodulator of claim 2, wherein said correlation modifier takes a square root of said maximum correlation value.

4. The demodulator of claim 1, wherein for each said block, said interference estimator multiplies said particular product codeword by said maximum correlation value, temporarily stores resulting values, and calculates said interference correction data by subtracting similar resulting values obtained when said designated station was previously designated.

5. The demodulator of claim 1, wherein for each said block, said interference estimator temporarily stores said maximum correlation value, subtracts a corresponding maximum correlation value obtained when said designated station was previously designated, thereby obtains a difference value, and calculates said interference correction data by multiplying said particular product codeword by said difference value.

6. The demodulator of claim 1, wherein said product codeword generator comprises:

an orthogonal codeword generator for generating said codewords;

a spreading code generator for generating said spreading code; and a multiplier for multiplying chip values of said codewords by corresponding chip values of said spreading code.

7. The demodulator of claim 1, wherein identical received chip data are input to all said memory areas.

8. The demodulator of claim 1, wherein each of said areas in said memory is organized as a shift register with a first stage and a last stage, received chip data being input into said first stage and shifted toward said last stage.

9. The demodulator of claim 1, wherein said information identifying a codeword is the codeword itself.

10. The demodulator of claim 1, wherein said information identifying a codeword is a codeword number.

11. A method of demodulating a block-spreading code-division multiple-access signal received from a plurality of transmitting stations, comprising the steps of:

storing received chip data and updated chip data in a memory divided into separate memory areas, each memory area corresponding to a different transmitting station, and each memory area storing data for a plurality of blocks including at least a newest block and an oldest block;

designating a transmitting station and its corresponding memory area whenever said transmitting station finishes transmitting a block, thus obtaining a designated transmitting station and designated memory area;

spreading a plurality of orthogonal codewords by a spreading code used by said designated transmitting station, thereby obtaining, for each block, a plurality of product codewords;

correlating the data stored for each of said blocks in the designated memory area with all of the product codewords obtained for that block;

selecting, for each block, a particular product codeword that gives a maximum correlation value;

outputting, for said oldest block, said maximum correlation value and information identifying a codeword that was spread to generate said particular product codeword;

using the particular product codeword and maximum correlation value for each block to estimate interference that was generated by said designated transmitting station and has not yet been subtracted from data of other transmitting stations, thereby obtaining interference correction data; and updating all data stored in said memory, except data stored in said designated memory area, by subtracting said interference correction data, thereby canceling interference.

12. The method of claim 11, wherein said step of using said particular product codeword and said maximum correlation value to estimate interference comprises:

multiplying said particular product codeword by said maximum correlation value to obtain an interference estimate;

temporarily storing said interference estimate, so that a current interference estimate and a previous interference estimate are simultaneously available; and subtracting said previous interference estimate from said current interference estimate, thereby obtaining said interference correction data.

13. The method of claim 11, wherein said step of using said particular product codeword and said maximum correlation value to estimate interference comprises:

storing said maximum correlation value, so that, for each block, a current maximum correlation value and a previous maximum correlation value are available simultaneously;

subtracting said previous maximum correlation value from said current maximum correlation value to obtain a difference value; and multiplying said difference value by said particular product codeword, thereby obtaining said interference correction data.

14. The method of claim 11, comprising the further step of modifying said maximum correlation value, by raising said maximum correlation value toward unity, before said step of using the particular product codeword and maximum correlation value for each block to estimate interference.

15. The method of claim 14, wherein said further step of modifying said maximum correlation value comprises taking a square root of said maximum correlation value.

16. The method of claim 11, comprising the further step of shifting data stored in each of said memory areas, thereby making room for new received chip data.

* * * * *